United States Patent
Mizunuma (10) Patent No.: US 8,434,442 B2
(45) Date of Patent: May 7, 2013

(54) GLOW PLUG ENGINE (75) Inventor: Kazuyuki Mizunuma, Tochigi (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 233 days.

(21) Appl. No.: 12/968,933

(22) Filed: Dec. 15, 2010

(65) Prior Publication Data
US 2011/0146608 A1 Jun. 23, 2011

(30) Foreign Application Priority Data

Dec. 18, 2009 (JP) ................................. 2009-287410
Nov. 26, 2010 (JP) ................................. 2010-263644

(51) Int. Cl.
*F23Q 7/00* (2006.01)

(52) U.S. Cl.
USPC ............. 123/145 A; 123/145 R; 123/142.5 E; 219/267; 219/270

(58) Field of Classification Search ............ 123/142.5 E, 123/145 R, 145 A; 219/260, 267, 270
See application file for complete search history.

(56) References Cited

U.S. PATENT DOCUMENTS

| | | | | |
|---|---|---|---|---|
| 3,232,055 A * | 2/1966 | Saintsbury | ................. | 60/39.821 |
| 3,911,326 A * | 10/1975 | Ohlsson | ................. | 361/264 |
| 3,980,067 A * | 9/1976 | Remington | .............. | 123/179.11 |
| 4,088,105 A * | 5/1978 | Bhat et al. | ................. | 123/145 A |
| 4,641,612 A * | 2/1987 | Chalke | ................. | 123/145 A |
| 5,063,890 A * | 11/1991 | Hironaka | ................. | 123/145 A |
| 5,307,701 A * | 5/1994 | Thonnard | ................. | 74/7 E |
| 5,367,994 A * | 11/1994 | Hinkle | ................. | 123/145 A |
| 6,342,690 B1 * | 1/2002 | O'Donnell | .................... | 219/270 |
| 6,346,688 B1 * | 2/2002 | O'Donnell | .................... | 219/270 |
| 6,691,660 B2 * | 2/2004 | Silva et al. | ................. | 123/179.6 |
| 6,696,670 B1 * | 2/2004 | O'Donnell | .................... | 219/270 |
| 7,176,414 B1 * | 2/2007 | O'Donnell | .................... | 219/270 |
| 7,470,875 B1 * | 12/2008 | Wilcox et al. | ................. | 219/270 |
| 8,022,337 B2 * | 9/2011 | Wilcox et al. | ................. | 219/264 |

FOREIGN PATENT DOCUMENTS

| | | |
|---|---|---|
| JP | 64-80771 | 3/1989 |
| JP | 09-53429 | 2/1997 |

* cited by examiner

*Primary Examiner* — Erick Solis
(74) *Attorney, Agent, or Firm* — Konomi Takeshita (57) ABSTRACT

The object of the present invention is to provide a glow-plug engine capable of achieving suitable operation using a glow plug even for various kinds of fuel other than special alcohol based fuel. The end section of a glow plug protrudes inside a combustion chamber and is located in a specified area near the top surface 53a of piston when located at the top dead center. By doing so, it is possible to achieve suitable operation (combustion) using a glow plug even for various kinds of fuel other than special alcohol based fuels.

20 Claims, 5 Drawing Sheets

GLOW PLUG ENGINE

CROSS REFERENCE TO RELATED APPLICATIONS

This application claims priority under 35 U.S.C. 119 based upon Japanese Patent Application No. 2009-287410, filed on Dec. 18, 2009 and No. 2010-263644, filed on Nov. 26, 2010. The entire disclosure of the aforesaid applications is incorporated herein by reference.

FIELD OF THE INVENTION

The present invention relates to a glow-plug engine that uses a glow plug to perform compression ignition of a premixed air-fuel mixture.

BACKGROUND OF THE INVENTION

Conventionally, glow-plug engines have been widely used mainly in model airplanes because glow-plug engines do not require an ignition system as in the case of spark ignition, and because it is relatively easy to make the construction of glow-plug engines simple and compact.

In this kind of engine, as disclosed in Japanese Patent Application Publication No. H9-53429, a glow plug is generally held in the cylinder head so that the tip end of the glow plug is located at the top section of the combustion chamber. Basically, power for heating the heat core is distributed to the glow plug only when starting the engine. After the engine has started, no power is distributed to the glow plug. Instead, the heat of the heat core is maintained at a specified amount by the compression heat or the combustion heat of the premixed air-fuel mixture, and the engine is kept running by this heat core igniting the compressed air-fuel mixture.

A diesel engine is known as an engine that uses a glow plug. However, a diesel engine basically performs compression self ignition (natural ignition) of fuel that is injected into the combustion chamber, and is different in character from a glow-plug engine that performs compression ignition of a premixed air-fuel mixture.

Moreover, a so-called hot bulb engine that performs ignition using compression heat or combustion heat is known, however, similar to a diesel engine, a hot bulb engine basically performs compression self ignition (natural ignition) of fuel that is injected into the combustion chamber, and is different in character than a glow-plug engine that performs compression ignition of a premixed air-fuel mixture.

Furthermore, Japanese Patent Application Publication No. S64-80771 discloses a direct-injection gasoline engine having a compression ratio of 10 to 18, wherein a heating element which is heated by just distributing power to a ceramic heater, or a heating element to which catalyst such as platinum is attached and is heated by power distribution and self heating is provided inside the combustion chamber, such that the engine ignites the fuel by keeping the heating element at high temperature by power distribution or by power distribution and self heating. This engine directly injects fuel into the combustion chamber and performs compression ignition, which is different in character from a glow-plug engine that performs compression ignition of a premixed air-fuel mixture. In addition, in this type of engine, it is necessary to perform suitable control of the fuel injection period in order to adjust the ignition period, as well as power must be distributed to the heating element always, so when compared with a glow-plug engine, an additional system is needed for controlling the fuel injection and power distribution, and thus construction becomes complicated.

Incidentally, in a glow plug engine, ignition control at arbitrary timing such as in a spark ignition type engine is difficult, and in order to maintain certain ignition performance, normally a special fuel such as methanol is used as a main fuel.

However, this kind of alcohol based fuel is expensive when compared with other fuels such as gasoline and LP gas that are widely distributed in the market. In addition, in order to induce ignition, large amounts of chemicals are typically added to this kind of alcohol based fuel.

Therefore, from aspects such as operating cost and environmental measures, glow-plug engines are only used in certain limited fields, and in order to promote more wide use of glow-plug engines, there is a need for adaptation to various kinds of fuels, including gasoline.

However, in this kind of glow-plug engine by simply replacing alcohol based fuel with gasoline, problems such as accidental firing, knocking, backfiring occur, making continuous operation difficult, so is not practical. In order to be able to perform continuous operation in such a case, power must be continuously distributed to the glow plug as disclosed in Japanese Patent Application No. S64-80771, which is not practical.

Considering the above situation, the purpose of the present invention is to provide a glow-plug engine that is capable of adequate operation using a glow plug for a variety of fuels other than special alcohol-based fuel.

SUMMARY OF THE INVENTION

According to one embodiment of the present invention, there is provided a glow-plug engine comprising:

a combustion chamber to which a premixed air-fuel mixture is introduced, a piston that compresses the premixed air-fuel mixture introduced in the combustion chamber, and a glow-plug with a tip end section that is exposed into the combustion chamber for igniting the premixed air-fuel mixture compressed by the piston;

wherein the glow-plug protrudes toward a top surface of the piston in the combustion chamber, and the tip end section of the glow-plug is placed in a prescribed region near the top surface of the piston when the piston is positioned at a top dead center.

With the glow-plug engine of the present invention, it is possible to achieve suitable operation using a glow plug for various kinds of fuel other than special alcohol based fuel.

Other features and advantages of the present invention will become apparent from the following detailed description, taken in conjunction with the accompanying drawings, which illustrate, by way of example, the principles of the invention.

DETAILED DESCRIPTION OF THE INVENTION

Figure 1:
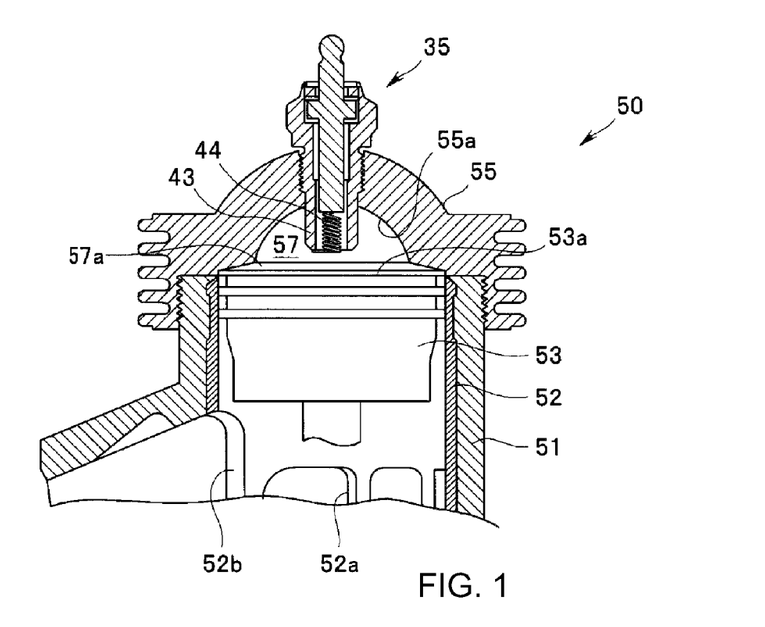
FIG. 1 is a cross-sectional view of an engine of a first embodiment of the present invention.
Figures 2A, 2B:
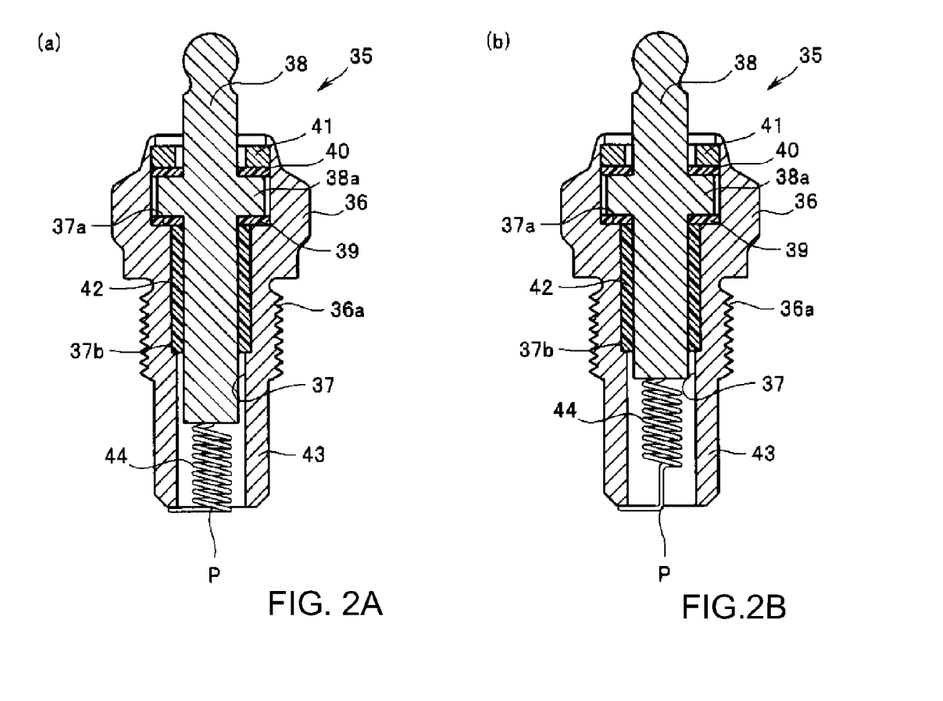
FIG. 2A is a cross-sectional view of a glow plug.
FIG. 2B is a cross-sectional diagram of a variation of the glow plug.
Figure 3:
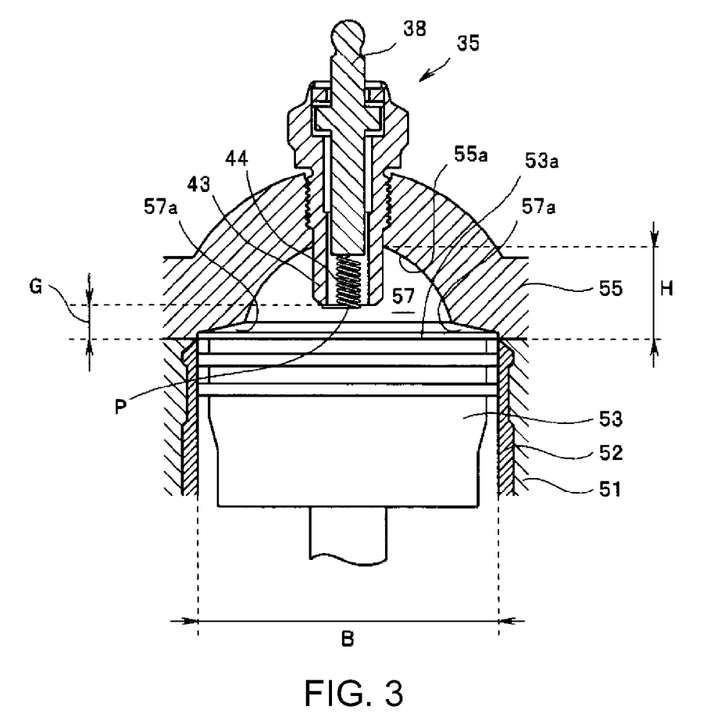
FIG. 3 is an enlarged cross-sectional view illustrating the relationship between a piston positioned at a top dead center and glow plug.
Figure 4:
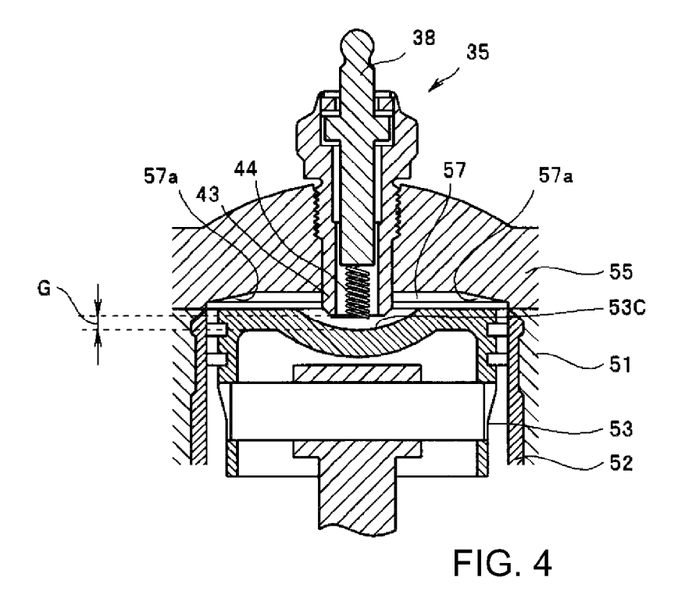
FIG. 4 is an enlarged cross-sectional view illustrating a variation of the relationship between a piston positioned at a top dead center and glow plug.
Figure 5:
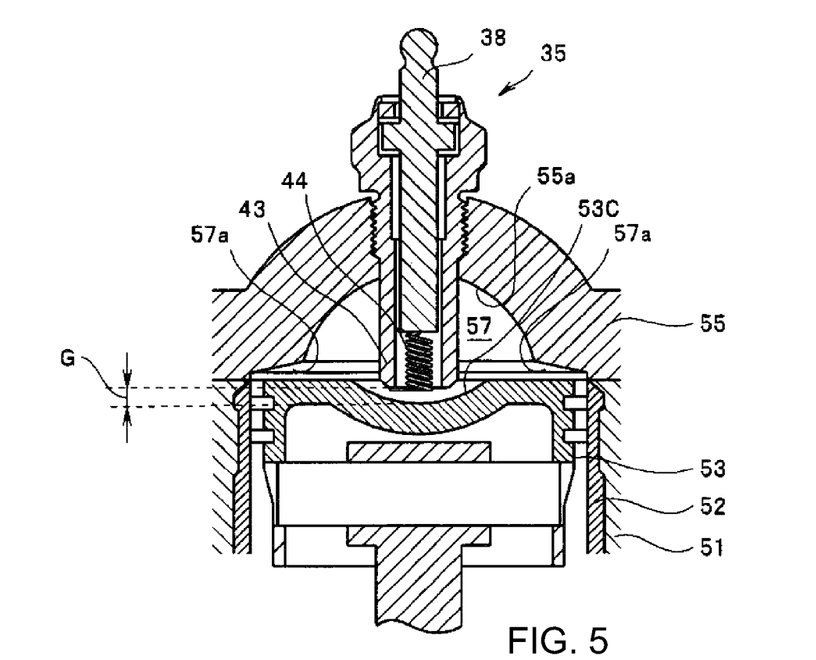
FIG. 5 is an enlarged cross-sectional view illustrating a variation of the relationship between a piston positioned at a top dead center and glow plug.
Figure 6:
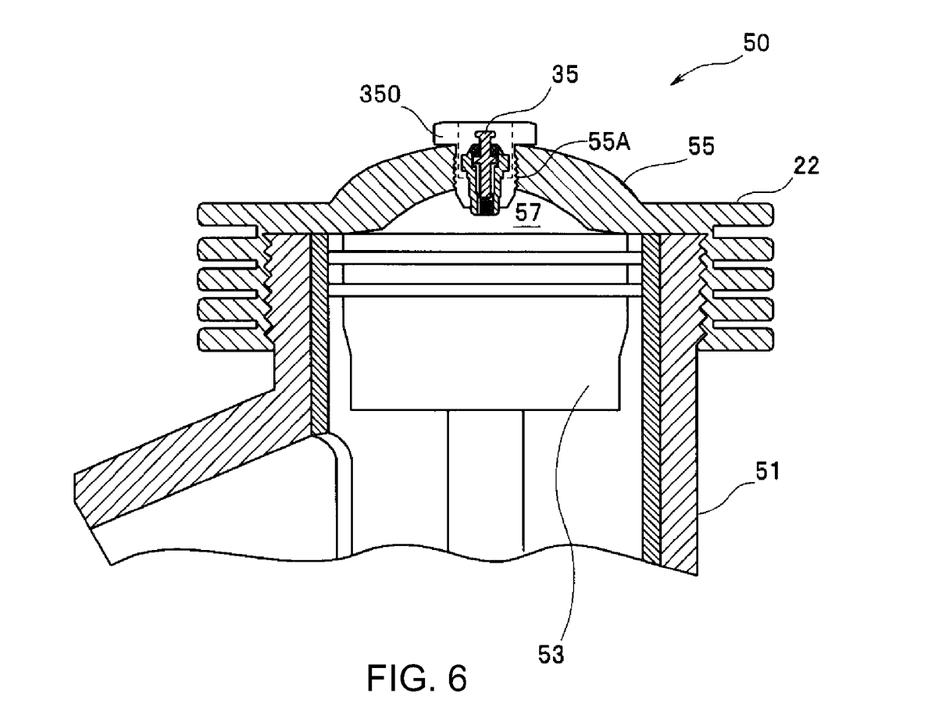
FIG. 6 is an enlarged cross-sectional view illustrating a variation of the relationship between a piston positioned at a top dead center and glow plug.

In the following, preferred embodiments of the present invention will be described in detail with reference to the accompanying, exemplary diagrams. FIG. 1 to FIG. 6 relate to a first embodiment of the present invention, wherein FIG. 1 is a cross-section view of an engine, FIG. 2A is a cross-sectional view of a glow plug, FIG. 2B is a cross-sectional view of a variation of a glow plug, FIG. 3 is an enlarged cross-sectional view illustrating the relationship between a piston that is located at the top dead center and a glow plug, and FIG. 4 to FIG. 6 are enlarged cross-sectional views illustrating variations of the relationship between a piston that is located at the top dead center and a glow plug. This embodiment illustrates one example of applying the present invention to a 2-stroke engine.

The engine 50 illustrated in FIG. 1 is a glow-plug engine that performs compression ignition of a premixed air-fuel mixture using a glow plug, and more specifically, in this embodiment the engine is a general-purpose, 21 cc 2-stroke single-cylinder engine that is suitable as a power source for a brush cutter or the like.

A piston 53 is inserted inside the cylinder 51 of this engine 50 via a cylinder liner 52 so that it can freely move back and forth, wherein an exhaust port 52a and an exhaust port 52b that are opened in the inner wall surface of the cylinder liner 52, an exhaust port 52b and intake port (not illustrated in the figure) are opened and closed by the reciprocating motion of the piston 53.

A cylinder head 55 is provided on the top section of the cylinder 51, and this cylinder head 55, together with the cylinder liner 52 and piston 53, forms a combustion chamber 57. Here, in this embodiment, a concave section 55a having a dome shape, for example, is formed on the bottom surface of the cylinder head 55, and the area inside the combustion chamber 57 that corresponds to a tapered surface that is continuous with the base section of this concave section 55a is provided as a squish area 57a.

A glow plug 35 for igniting a premixed air-fuel mixture that is introduced from the intake port is mounted in the cylinder head 55 such that the tip end side of the glow plug 35 faces the inside of the combustion chamber 57.

Here, the glow plug 35 will be explained in detail. As illustrated in FIG. 2A, the glow plug 35 has a metal plug housing 36 with a male screw thread section 36a formed around the outer surface thereof, and a through hole 37 is formed in this plug housing 36 such that the inner diameter thereof gradually becomes more narrow in the direction from the base section side to the tip end side by way of two stepped sections 37a, 37b.

A metal center electrode 38 having an outward flange 38a in the middle is inserted in the through hole 37. The center electrode 38 is held inside the plug housing 36 by the tip end side of the outward flange 38a coming in contact with the stepped section 37a via an insulator 39, and the base section side of the outward flange 38a coming in contact with a metal washer 41 that is fastened to the base end section of the plug housing 36 via an insulator 40 such that the center electrode 38 is positioned in the axial direction.

Furthermore, in order to position the center electrode 38 in the radial direction, a cylindrical member 42 having insulating properties is placed between the through hole 37 and center electrode 38, and this cylindrical member 42 is held inside the plug housing 36 by the tip end section thereof engaging with the stepped section 37b.

Here, as illustrated in the figure, the tip end side of the plug housing 36 protrudes further than the tip end of the center electrode 38, and a heat core 44 is housed inside the protruding cylindrical section 43. In other words, the tip end section of the cylindrical section 43 is a communicating section that communicates the inner space where the heat core 44 is housed to the combustion chamber 57. In this embodiment, the heat core 44 comprises a coil shaped filament made of a metal alloy having a composition of 70% platinum and 30% rhodium, where one end is electrically connected to the center electrode 38, and the other end is electrically connected to the cylindrical section 43 at a position that is the end surface of the cylindrical section 43. The center of the tip end surface of this cylindrical section 43 is taken to be the tip end section P of the glow plug 35.

Here, the significance of the tip end section P of the glow plug 35 will be described. As illustrated in FIG. 2B, with the heat core 44 in the retreated state at the back section of the cylindrical section 43, various identical combustion experiments were performed. As a result, it was found that nearly the same results were obtained regardless of the position of the heat core 44 in the cylindrical section 43. From this, it can be seen that for the placement of the glow plug 35 the position of the tip end section P is important.

Power for heating the heat core is distributed to the glow plug 35 basically only when starting the engine 50. After the engine 50 has started, power is not distributed to the glow plug 35 and the amount of heat of the heat core 44 is kept at a specified amount by compression heat and combustion heat of a premixed air-fuel mixture. Rotation of the engine is maintained by the heat core 44 igniting the compressed premixed air-fuel mixture.

In this embodiment, as illustrated in FIG. 3, the glow plug 35 is mounted in the center section of the cylinder head 55, and the tip end side of the glow plug 35 faces down vertically toward the piston 53. In other words, the glow plug 35 protrudes inside the combustion chamber 57 toward the top surface 53a of the piston 53. In addition, inside the combustion chamber 57, the tip end section P of the glow plug 35 is located in a specified area that is near the top surface 53a of the piston 53 when located at the top dead center.

Here, the specified area near the top surface 53a of the piston 53 when located at the top dead center is, for example, an area that satisfies the relationship $0 \leq G/H \leq 0.8$, where the distance from the tip end section P of the glow plug 35 to the top surface 53a of the piston 53 when located at the top dead center is taken to be G, and the distance from the top surface 53a of the piston 53 when located at the top dead center to the top section of the combustion chamber 57 is taken to be H. Better combustion can be achieved the smaller the distance G from the tip end section P of the glow plug 35 to the top surface 53a of the piston 53 is, so preferably $0 \leq G/H \leq 0.6$, and more preferably $0 \leq G/H \leq 0.4$. Or, the specified area is an area near the top surface 53a of the piston 53 when located at the top dead center that satisfies the relationship $0 \leq G/B \leq 0.4$, where the distance from the tip end section P of the glow plug 35 to the top surface 53a of the piston 53 when located at the top dead center is taken to be G, and the cylinder diameter is taken to be B. Better combustion can be achieved the smaller the distance G from the tip end section P of the glow plug 35 to the top surface 53a of the piston 53 is, so preferably $0 \leqq G/B \leqq 0.3$, and more preferably $0 \leqq G/B \leqq 0.2$. Good combustion can be achieved even when the distance G is nearly zero. In addition, the specified area above is preferably an area that is located in the vicinity above a line extending from the center axis of the top surface 53a of the piston 53.

The distance G from the tip end section P of the glow plug 35 to the top surface 53a of the piston 53 when located at the top dead center was defined, however, that distance G is described in more detail below. The distance from the tip end section P of the glow plug 35, facing downward in the vertical direction (stroke direction of the piston 53), to the top surface 53a of the piston 53 is taken to be G. For example, when the top surface 53a of the piston 53 is a flat surface, the distance G is the shortest distance from the tip end section P of the glow plug 35 to the top surface 53a.

The distance H from the top surface 53a of the piston 53 when located at the top dead center to the top section of the combustion chamber 57 was defined as H, however that distance H is defined in more detail below. The distance from the deepest portion of the concave section 55a that is formed in the bottom of the cylinder head 55, facing downward in the vertical direction (stroke direction of the piston 53), to the top surface 53a of the piston 53 is taken to be H. For example, when the cylinder head 55 has a deep dome shape having its center at the deepest end, the distance H is the distance from the center of the top surface 53a of the piston 53 to the bottom surface of the cylinder head 55 that is located facing upward in the vertical direction (stroke direction of the piston 53). When the glow plug 35 is placed at a position that would be the deepest portion of the bottom surface of the cylinder head 55 (the first embodiment also corresponds to this), the distance H is calculated by estimating the position that will be the deepest portion when the glow plug 35 is not in place (see FIG. 3).

Moreover, upon detailed investigation of the specifications for a suitable heat core 44 (filament), good combustion is possible when the wire diameter is within a range of 0.16 to 0.25 mm. Good combustion is also possible when in this case the winding diameter is in the range 0.8 to 1.4 mm. In addition, good combustion is possible when the number of windings is within the range of 6 to 9 windings. Of these conditions, the best combustion was particularly achieved for a heat core 44 having a wire diameter of 0.2 mm, winding diameter of 1.2 mm and 9 windings. However, the optimum conditions for the heat core 44 differ depending on various conditions such as the shape of the combustion chamber, position of the glow plug and the like, so the conditions for the heat core 44 are not limited to these.

In this embodiment, the compression ratio when a glow plug 35 as described above is mounted in an engine 50 is 5 or greater and less than 10. In order to achieve good combustion, the compression ratio is preferably 6 or greater and less than 9.

The inventors performed a combustion test of an engine 50 using the configuration described above and gasoline as fuel, and as a result were able to confirm that good combustion with no misfiring, knocking or backfiring could be achieved, or in other words, good engine operation could be achieved. In other words, by bringing the tip end section of the glow plug, which was conventionally located near the top section of the combustion chamber, close to the top surface of the piston, it was confirmed that good combustion could be achieved using a glow plug not only for special alcohol based fuel, but also when gasoline was used as the fuel.

Moreover, as conditions for good operation (combustion) of the engine 50 using gasoline as fuel, it can be presumed that setting the starting point of the flame propagation (flame kernel) at a suitable location is more important than the location of the heat core 44 inside the combustion chamber 57. In other words, causing the initial combustion flame to propagate from near the center to outward in the radial direction along the top surface 53a of the piston 53 by bringing the position of the tip end section P of the glow plug 35 inside the combustion chamber 57 close to the top surface 53a of the piston 53, and after that, causing the flame to propagate toward the top section of the combustion chamber 57 can be presumed to be important conditions for making a glow plug suitable for gasoline. As a further consideration, causing the air-fuel mixture near the squish area 57a (in other words, so-called end gas when the air-fuel mixture is ignited with the top section of the combustion chamber as the starting point), which is considered to be the cause of knocking, by causing the initial combustion flame to propagate from near the center to outward in the radial direction along the top surface 53a of the piston 53, can be presumed to be an important factor for making a glow plug suitable for gasoline.

Furthermore, the inventors performed a combustion test of an engine 50 having the construction described above using ethanol, LP gas and kerosene as the fuel. For these fuels as well, good combustion could be achieved as in the case of gasoline. Particularly, gasoline, LP gas and kerosene are fuels having an ignition point that is lower than that of alcohol based fuels for a glow-plug engine (hereafter, these fuels will be referred to as low ignition point fuel). When a low ignition point fuel was applied to a glow-plug engine, because the ignition point of low ignition point fuel is lower than that of alcohol based fuel, in other words, is easier to ignite, the inventors first thought that the ignition timing would be earlier than the suitable timing. However, as a result of dedicated research, the inventors found that by continuing to distribute power to the glow plug in order to maintain a red hot state, it is possible to adequately drive a glow-plug engine that uses a low ignition point fuel. From this, it was found that the reason that it is not possible to adequately drive a glow-plug engine in a normal state in which no power being distributed to the glow plug except for the beginning of operation differs from conventional knowledge, and is because the ignition timing is later than suitable timing. In addition, the inventors found that by having the glow plug protrude into the combustion chamber, it is possible to quicken the ignition timing for igniting a low ignition point fuel, and thus the inventors were successful in achieving good combustion using a low ignition point fuel. The engine 50 is a 2-stroke engine, so a suitable amount of engine oil is mixed in the fuel.

In this way, with this embodiment, by having the glow plug protrude inside the combustion chamber 57 toward the top surface 53a of the piston 53, and locating the tip end section P of the glow plug 35 in a specified area near the top surface 53a of the piston 53 when located at the top dead center, it is possible to achieve good operation (combustion) using a glow plug 35 when using fuel other than special alcohol based fuel, for example low ignition point fuel such as gasoline. In other words, by locating the tip end section P of the glow plug 35 at a position where it is possible to set the starting point for combustion of an air-fuel mixture (flame kernel) approximately on the top surface of the piston 53 (more specifically, approximately in the center of the top surface of the piston 53), it is possible to achieve adequate operation (combustion)

using a glow plug, even when using various fuels other than a special alcohol based fuel, for example, a low ignition point fuel such as gasoline.

Moreover, with this embodiment, the tip end section of the cylindrical section 43 that houses the heat core 44 is communicated with the combustion chamber. In doing so, the heat core 44 comes in direct contact with the air-fuel mixture. With this construction, the heat core 44 also performs the function as a catalyst, which is one contributing factor for good combustion. In this embodiment, a communicating section is formed on the tip end section of the cylindrical section 43, however, construction is not limited to this, and the same effect can be obtained by forming the communicating section on the side surface near the tip end.

Furthermore, with this embodiment, combustion is performed with a compression ratio less than 10. Under this kind of compression ratio, rather than combustion due to natural ignition such as in the case of a diesel engine, combustion based on ignition at a position on the tip end section of the glow plug 35 itself is dominant. Therefore, the glow plug 35 in this embodiment has the function of generating a flame kernel with the tip end section P of the glow plug 35 as the starting point, rather than the function of increasing the temperature around the plug and promoting natural ignition as in the case of a glow plug of a diesel engine. In other words, the engine 50 of this embodiment has a combustion mechanism that differs from natural ignition as in the case of a diesel engine. The present invention makes it possible to achieve good combustion of gasoline, which was not possible to achieve before, by bringing the flame kernel that is generated at a the top section of the combustion chamber as in a conventional glow-plug engine close to the top surface of the piston.

Incidentally, as illustrated in FIG. 4 and FIG. 5, depending on the specifications of the engine 50, a cavity 53C may be formed in the top surface of the piston 53. Even in such a case, by setting the distance G between the top surface 53*a* of the piston 53 located at the top dead center (more specifically, the surface of the cavity 53C) and the tip end section P of the glow plug 35 such that it is within the range described above, it is possible to achieve suitable combustion even when using a fuel other than special alcohol based fuel, for example a low ignition point fuel such as gasoline.

Moreover, in the embodiment above, the glow plug 35 was directly mounted in the cylinder head 55, however, as illustrated in FIG. 6 for example, the glow plug 35 can be mounted by way of an adapter 350. The adapter 350 has a cylindrical shape with a screw formed around the outer surface that screws into a screw hole 55A formed in the cylinder head 55. At the base end side of the adapter 350 a large diameter nut section is formed such that it comes in contact with the top surface of the cylinder head 55 when the adapter 350 is screwed into the screw hole 55A of the cylinder head 55. The tip end side of the adapter 350 protrudes inside the combustion chamber 57. The glow plug 35 is fastened inside the adapter 350 so that it protrudes from the tip end section of the adapter 350.

The adapter 350 is preferably formed of a material having lower thermal conductivity than the cylinder head 55. For example, in the case where the cylinder head 55 is aluminum, the adapter 350 can be formed of steel, titanium, SUS, brass or the like. By using this kind of adapter 350, it becomes difficult for the heat held by the heat core 44 inside the glow plug 35 to transfer to the cylinder head 55 that functions as a heat dissipation member, and thus it is possible to keep the heat core 44 in a red hot state during operation of the engine 50.

With this embodiment, the adapter 350 protrudes inside the combustion chamber 57 together with the glow plug 35. Therefore, the compression ratio of the engine 50 can be adjusted by changing the shape of the adapter 350, so with the adapter 350 it becomes easy to set the optimum combustion conditions. In addition, when trying to apply a glow plug 35 to a spark ignition type engine, it is possible that the condition will often occur in which the outer diameter of a glow plug that can be typically obtained commercially will be smaller than the outer diameter of a spark plug. In such a case, by preparing an adapter 350, it is possible to use a typical commercially available glow plug without having to specially manufacture a glow plug that will correspond to the outer diameter of a spark plug.

In the first embodiment described above, the glow plug 35 is located approximately in the center of the cylinder head 55 so that it faces the top surface 53*a* of the piston 53 in the vertical direction. However, the location of the glow plug 35 is not limited to this and could also be located such that it faces the top surface 53*a* of the piston 53 in the diagonal direction instead of in the vertical direction. In the present invention, good combustion can be achieved in a glow-plug engine as long as the tip end section P of the glow plug 35 is located in a specified area regardless of the direction the glow plug 35 faces in.

Figure 7:
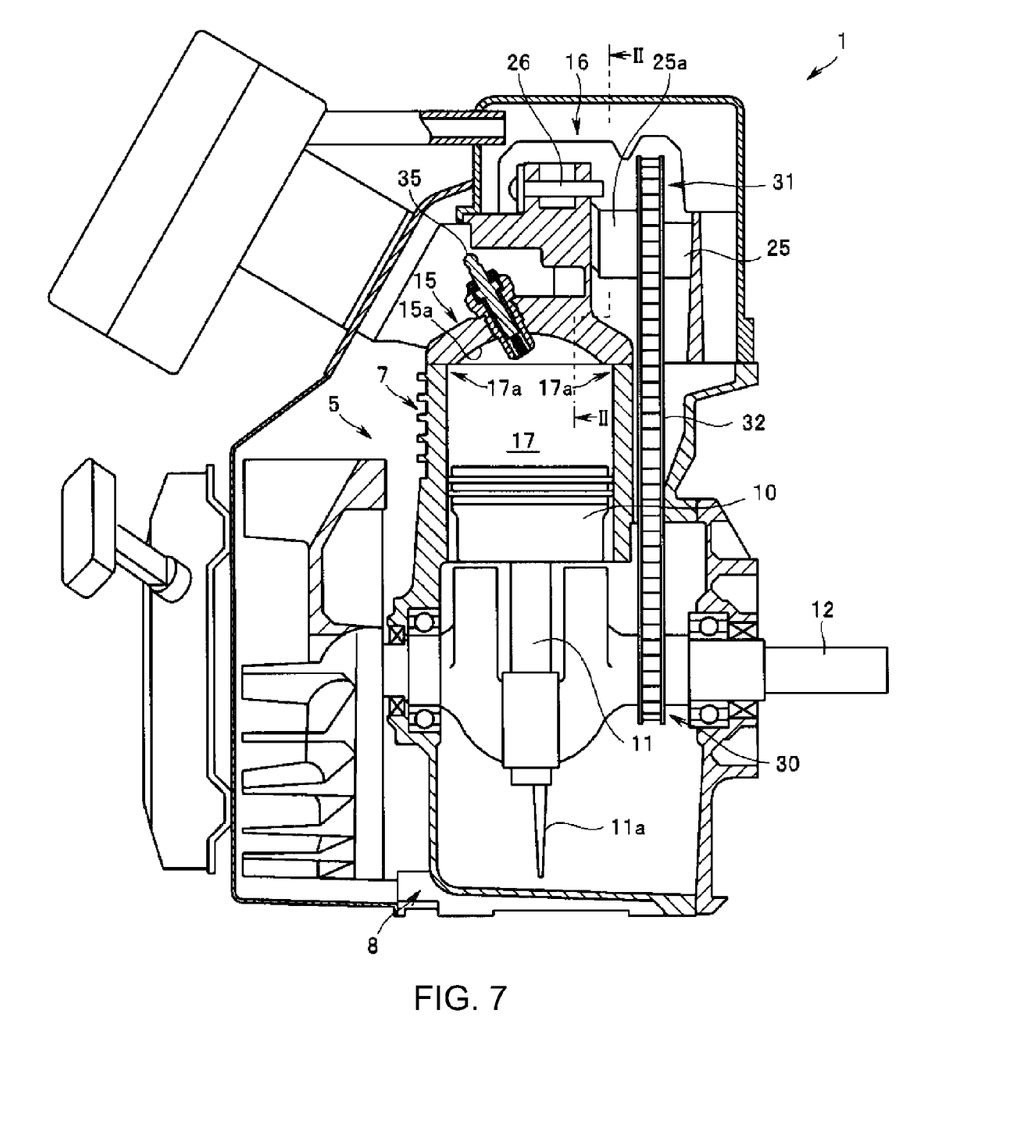
FIG. 7 is a cross-sectional view of an engine of a second embodiment of the present invention.
Figure 8:
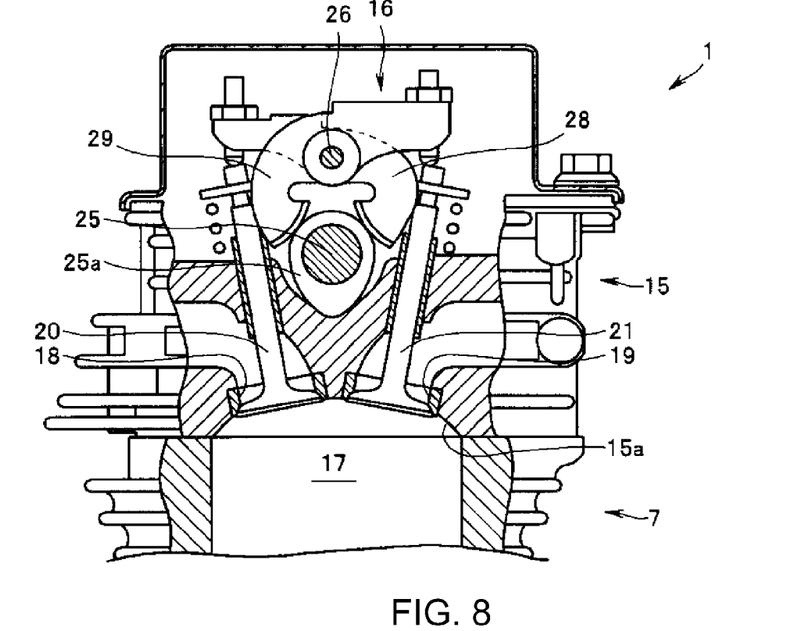
FIG. 8 is a cross-sectional view along section II-II in FIG. 7.
Figure 9:
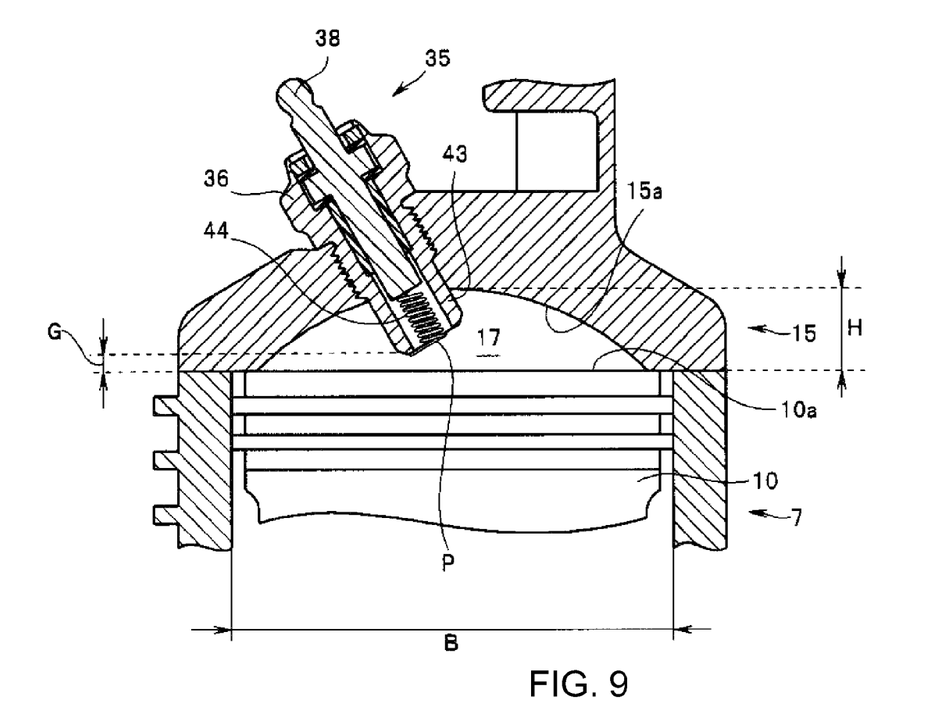
FIG. 9 is an enlarged cross-sectional view illustrating the relationship between a piston positioned at a top dead center and glow plug.

Next, FIG. 7 to FIG. 9 illustrate a second embodiment of the present invention, where FIG. 7 is a cross-sectional view of an engine, FIG. 8 is a cross-sectional view along section II-II in FIG. 7, and FIG. 9 is an enlarged cross-sectional view illustrating the relationship between the piston located at the top dead center and the glow plug. In this embodiment, the same reference numbers are used for construction that is the same as that of the first embodiment above, and an explanation of that construction is omitted.

The engine 1 illustrated in FIG. 7 is a glow-plug engine that performs compression ignition of a premixed air-fuel mixture using a glow plug, and more specifically, in this embodiment is a 170 cc general-purpose 4-stroke, single cylinder engine that is suitable as a power source for work equipment such as a generator or rammer.

This engine 1 has a cylinder block 5, and a cylinder 7 and crankcase 8 are integrally formed in this cylinder block 5. A free sliding piston 10 is inserted inside the cylinder 7, and the bottom section of this piston 10 is connected to a crankshaft 12, which is supported inside the crankcase 8 such that it can freely rotate, via a connecting rod 11. Lubrication oil is stored in the crankcase 8, and this lubrication oil lubricates all of the moving sections of the engine 1 by being scraped up by an oil scraper 11*a* that is fastened to the connecting rod 11.

As illustrated in FIG. 7 and FIG. 8, a cylinder head 15 having a valve mechanism 16 is provided on the top end of the cylinder block 5, and this cylinder head 15, together with the cylinder 7 and piston 10, form the combustion chamber 17. Here, in this embodiment, a dome shaped concave section 15*a* is formed in the bottom surface of the cylinder head 15, and an area inside the combustion chamber 17 that corresponds with the flat surface that connects to the base section of the concave section 15*a* is set as the squish area 17*a*.

In addition, an intake port 18 that supplies premixed air-fuel mixture to the combustion chamber 17, and an exhaust port 19 that discharges combustion gas are formed in the cylinder head 15, and an intake valve 20 that opens and closes the intake value 18, and an exhaust value 21 that opens and closes the exhaust port 19 are assembled in the cylinder head 15. In order to open and close the intake valve 20 and exhaust valve 21, a camshaft 25 comprising a cam 25*a* is mounted in the cylinder head 15 such that it can rotate freely. Moreover, a rocker shaft 26 parallel to the camshaft 25 is mounted in the cylinder head 15; the rocker shaft 26 supports an intake-side rocker arm 28 that opens and closes the intake value 20, and an exhaust-side rocker arm 29 that opens and closes the exhaust value 21 such that they freely rock. Furthermore, a timing chain 32 that transmits the rotation of the crankshaft 12 to the camshaft 25 is mounted between a crank sprocket 30 that is fastened to the crankshaft 12 and a cam sprocket 31 that is fastened to the camshaft 25; where the intake value 20 and exhaust value 21 are opened and closed at suitable timing in synchronization with the crank angle.

As illustrated in FIG. 7, a glow plug 35 for performing compression ignition of premixed air-fuel mixture that is supplied from the intake port 18 is mounted in the cylinder head 15, and the tip end side of this glow plug 35 faces the inside of the combustion chamber 17.

The glow plug 35 that is constructed in this way is mounted in the cylinder head 15 at a position that is offset to one side in order to avoid interference with the intake port 18 and exhaust port 19, and the tip end side of the glow plug 35 faces the center of the cylinder at an angle. In other words, the glow plug 35 protrudes inside the combustion chamber 17 facing the top surface 10a of the piston 10. Also, as illustrated in FIG. 9 for example, the tip end section P of the glow plug 35 is located in a specified area inside the combustion chamber that is near the top surface 10a of the piston when located at the top dead center.

Here, the specified area near the top surface 10a of the piston 10 when located at the top dead center is, for example, an area that satisfies the relationship $0 \leq G/H \leq 0.8$, where the distance from the tip end section P of the glow plug 35 to the top surface 10a of the piston 10 when located at the top dead center is taken to be G, and the distance from the top surface 10a of the piston 10 when located at the top dead center to the top section of the combustion chamber 17 is taken to be H. Better combustion can be achieved the smaller the distance G from the tip end section P of the glow plug 35 to the top surface 10a of the piston 10 is, so preferably $0 \leq G/H \leq 0.6$, and more preferably $0 \leq G/H \leq 0.5$, and further even more preferably $0 \leq G/H \leq 0.4$. Or, the specified area is an area near the top surface 10a of the piston 10 when located at the top dead center that satisfies the relationship $0 \leq G/B \leq 0.4$, where the distance from the tip end section P of the glow plug 35 to the top surface 10a of the piston 10 when located at the top dead center is taken to be G, and the cylinder diameter is taken to be B. Better combustion can be achieved the smaller the distance G from the tip end section P of the glow plug 35 to the top surface 10a of the piston 10 is, so preferably $0 \leq G/B \leq 0.3$, and more preferably $0 \leq G/B \leq 0.2$. Good combustion can be achieved even when the distance G is nearly zero. In addition, the specified area above is preferably an area that is located in the vicinity above a line extending from the center axis of the top surface 10a of the piston 10. The definition of distance G and distance H is the same as in the first embodiment.

The inventors performed a combustion test of an engine 1 using the construction described above and gasoline as fuel, and as a result were able to confirm that good combustion with no misfiring, knocking or backfiring could be achieved, or in other words, good engine operation could be achieved. In other words, by bringing the tip end section of the glow plug that was conventionally located near the top section of the combustion chamber close to the top surface of the piston, good combustion could be achieved using a glow plug not only for special alcohol based fuel, but also when gasoline was used as the fuel. Moreover, as in the first embodiment, it was confirmed that similar good combustion could be achieved when using ethanol, LP gas, and kerosene, or when using gasoline. In other words, good combustion could be achieved using a low ignition point fuel.

When neither the first embodiment or the section embodiment described above were used, and alcohol based fuel was simply replaced by gasoline in a conventional glow-plug engine, misfiring, knocking or backfiring occurred, making continued operation difficult, so is not practical.

The engine to which the present invention is applied is not limited to the displacement illustrated in the first embodiment and second embodiment above, for example, the present invention can of course be applied to a wide range from a 1.5 cc level to 250 cc or greater.

Moreover, machinery to which the engine of the present invention can be applied is not limited to that described above, and of course can be applied to various other kinds of machinery. For example, the present invention can be suitably applied as a model power source for engines having a displacement of 1.5 to 30 cc, can be suitably applied to a rammer engine having a displacement of 40 cc, can be suitably applied to a chain saw engine having a displacement of 40 cc, can be suitably applied to a lawn mower engine having a displacement of 26 cc, and can be suitably applied to a motorcycle engine having a displacement of 50 cc.

Furthermore, in the first and second embodiments, the bottom surface of the cylinder head 55, 15 was dome shaped, however the shape of the bottom surface is not limited to this, and the same effect can be obtained even for another shape such as a bathtub shape, hemispherical shape, wedge shape and pentroof shape.

EXAMPLES

In the following, the present invention will be explained in detail using some examples, and needless to say, the invention is not limited by these examples.

Example 1

In the first embodiment, a glow plug 35 comprising a heat core 44 having a wire diameter of 0.2 mm, and winding diameter of 1.2 mm, and 9 windings was prepared. The fuel used was gasoline. The distance H from the top surface 53a of the piston 53 when located at the top dead center to the top section of the combustion chamber 57 was 15 mm. The cylinder diameter B was 31 mm. The glow plug 35 was set in the engine 50 so that the distance G was 0.5 mm. The value G/H was 0.03, the value G/B was 0.02 and the compression ratio was 7.9. For about 3 seconds during start up, power is distributed in order to heat the heat core 44, then after start up power distribution is stopped.

In the entire range of operation there was no misfiring, knocking or backfiring, and there was good combustion, in other words, good engine operation was achieved.

Example 2

Except for setting the glow plug 35 in the engine 50 so that the distance G was 2.0 mm, testing was performed under the same conditions as in example 1. The value G/H was 0.13, the value G/B was 0.06 and the combustion ratio was 7.5. In the entire range of operation, there was no misfiring, knocking or backfiring, and there was good combustion, in other words, good engine operation was achieved.

Example 3

Except for setting the glow plug 35 in the engine 50 so that the distance G was 5.3 mm, testing was performed under the same conditions as in example 1. The value G/H was 0.35, the value G/B was 0.17 and the combustion ratio was 6.7. In the entire range of operation, there was no misfiring, knocking or backfiring, and there was good combustion, in other words, good engine operation was achieved.

Example 4

Except for setting the glow plug 35 in the engine 50 so that the distance G was 6.6 mm, testing was performed under the same conditions as in example 1. The value G/H was 0.44, the value G/B was 0.21 and the combustion ratio was 6.3. In the entire range of operation, there was no misfiring, knocking or backfiring, and there was good combustion, in other words, good engine operation was achieved.

Example 5

Except for setting the glow plug 35 in the engine 50 so that the distance G was 8.3 mm, testing was performed under the same conditions as in example 1. The value G/H was 0.55, the value G/B was 0.27 and the combustion ratio was 5.9. In the entire range of operation, there was no misfiring, knocking or backfiring, and there was good combustion, in other words, good engine operation was achieved.

Example 6

Except for setting the glow plug 35 in the engine 50 so that the distance G was 11.6 mm, testing was performed under the same conditions as in example 1. The value G/H was 0.77, the value G/B was 0.37 and the combustion ratio was 5.1. In the entire range of operation, there was no misfiring, knocking or backfiring, and there was good combustion, in other words, good engine operation was achieved. However, when compared with the examples 1 to 5, starting performance and the operating condition was inferior.

Comparative Example 1

Except for setting the glow plug 35 in the engine 50 so that the distance G was 13.0 mm, testing was performed under the same conditions as in example 1. The value G/H was 0.87, the value G/B was 0.42 and the combustion ratio was 4.0. The engine did not start.

Comparative Example 2

In embodiment 1, instead of a glow plug, a spark plug for a gasoline engine was prepared. The fuel used was gasoline. The distance H from the top surface 53a of the piston 53 when located at the top dead center to the top section of the combustion chamber 57 was 15 mm, the same as in example 1. The cylinder diameter B was 31 mm, also the same as in example 1. The spark plug was set in the engine 50 so that the distance G from the tip end section of the spark plug (tip end section of the center electrode) to the top surface 53a of the piston 53 when located at the top dead center was 7.0 mm. The value G/H was 0.47, the value G/B was 0.23 and the compression ratio was 5.4. The spark plug sparked only during start up, and the engine 50 started. The engine stopped soon after starting.

Example 7

In the second embodiment, a glow plug 35 comprising a heat core 44 was prepared. The fuel used was gasoline. The distance H from the top surface 10a of the piston 10 when located at the top dead center to the top section of the combustion chamber 17 was 11.1 mm. The diameter B of the cylinder was 67 mm. The glow plug 35 was set in the engine 1 so that the distance G was 5 mm. The value G/H was 0.45, the value G/B was 0.07 and the compression was 9.8. For about 3 second during start up, power was distributed in order to the heat the heat core 44, and after starting the distribution of power was stopped. In the entire range of operation, there was no misfiring, knocking or backfiring, and there was good combustion, in other words, good engine operation was achieved.

Comparative Example 3

Except for setting the glow plug 35 in the engine 1 so that the distance G was 9 mm, testing was performed under the same conditions as in example 7. The value G/H was 0.82, the value G/B was 0.13 and the combustion ratio was 8.5. For the engine 1, operation was achieved in a specified range of operation, however, in the entire range of operation, good combustion, or in other words, good operation could not be achieved.

Example 8

Except for using LP gas instead of gasoline, testing was performed under the same conditions as example 3. In the entire range of operation, there was no misfiring, knocking or backfiring, and there was good combustion, in other words, good engine operation was achieved.

Example 9

Except for using kerosene instead of gasoline, testing was performed under the same conditions as example 3. In the entire range of operation, there was no misfiring, knocking or backfiring, and there was good combustion, in other words, good engine operation was achieved.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. A glow-plug engine comprising:
   a combustion chamber to which a premixed air-fuel mixture is introduced,
   a piston that compresses the premixed air-fuel mixture introduced in the combustion chamber, and
   a glow-plug with a tip end section that is exposed into the combustion chamber for igniting the premixed air-fuel mixture compressed by the piston;
   wherein the glow-plug protrudes toward a top surface of the piston in the combustion chamber, and the tip end section of the glow-plug is placed in a prescribed region near the top surface of the piston when the piston is positioned at a top dead center, the prescribed region being determined to set a starting point for combustion of the premixed air-fuel mixture near the top surface of the piston.

2. The glow-plug engine of claim 1,
   wherein the prescribed region satisfies a relationship $0 \leq G/H \leq 0.8$, where a distance from the tip end section of the glow plug to the top surface of the piston when located at the top dead center is taken to be G, and a distance from the top surface of the piston when located at the top dead center to the top section of the combustion chamber is taken to be H.

3. The glow-plug engine of claim 1,
wherein the prescribed region satisfies a relationship $0 \leqq G/B \leqq 0.4$, where a distance from the tip end section of the glow plug to the top surface of the piston when located at the top dead center is taken to be G, and a diameter of a cylinder is taken to be B.

4. The glow-plug engine of claim 1,
wherein the prescribed region is located in the vicinity above a line extending from a center axis of the top surface of the piston.

5. The glow-plug engine of claim 1,
wherein a ratio of compression is 5 or greater and less than 10.

6. The glow-plug engine of claim 1,
wherein the glow-plug comprises a cylindrical section that houses a heat core on the tip end side, and a communicator is formed near a tip end of the cylindrical section for communicating an inner space that houses the heat core with the combustion chamber.

7. The glow-plug engine of claim 2,
wherein the glow-plug comprises a cylindrical section that houses a heat core on the tip end side, and a communicator is formed near a tip end of the cylindrical section for communicating an inner space that houses the heat core with the combustion chamber.

8. The glow-plug engine of claim 3,
wherein the glow-plug comprises a cylindrical section that houses a heat core on the tip end side, and a communicator is formed near a tip end of the cylindrical section for communicating an inner space that houses the heat core with the combustion chamber.

9. The glow-plug engine of claim 4,
wherein the glow-plug comprises a cylindrical section that houses a heat core on the tip end side, and a communicator is formed near a tip end of the cylindrical section for communicating an inner space that houses the heat core with the combustion chamber.

10. The glow-plug engine of claim 5,
wherein the glow-plug comprises a cylindrical section that houses a heat core on the tip end side, and a communicator is formed near a tip end of the cylindrical section for communicating an inner space that houses the heat core with the combustion chamber.

11. The glow-plug engine of claim 1,
wherein the premixed air-fuel mixture includes a fuel having an ignition point that is lower than that of alcohol, and air.

12. The glow-plug engine of claim 2,
wherein the premixed air-fuel mixture includes a fuel having an ignition point that is lower than that of alcohol, and air.

13. The glow-plug engine of claim 3,
wherein the premixed air-fuel mixture includes a fuel having an ignition point that is lower than that of alcohol, and air.

14. The glow-plug engine of claim 4,
wherein the premixed air-fuel mixture includes a fuel having an ignition point that is lower than that of alcohol, and air.

15. The glow-plug engine of claim 5,
wherein the premixed air-fuel mixture includes a fuel having an ignition point that is lower than that of alcohol, and air.

16. The glow-plug engine of claim 1,
wherein the premixed air-fuel mixture includes a fuel selected from the group consisting of gasoline, LP gas, and kerosene; and air.

17. The glow-plug engine of claim 2,
wherein the premixed air-fuel mixture includes a fuel selected from the group consisting of gasoline, LP gas, and kerosene; and air.

18. The glow-plug engine of claim 3,
wherein the premixed air-fuel mixture includes a fuel selected from the group consisting of gasoline, LP gas, and kerosene; and air.

19. The glow-plug engine of claim 4,
wherein the premixed air-fuel mixture includes a fuel selected from the group consisting of gasoline, LP gas, and kerosene; and air.

20. The glow-plug engine of claim 5,
wherein the premixed air-fuel mixture includes a fuel selected from the group consisting of gasoline, LP gas, and kerosene; and air.

* * * * *